United States Patent Office
3,553,576
Patented Jan. 5, 1971

3,553,576
HYGROSCOPIC PROBE APPARATUS FOR DETECTING THE WATER VAPOR CONTENT OF ORGANIC LIQUIDS
José Petitjean, Koningsloo, and Arthur Van Hove, Brussels, Belgium, assignors to Solvay & Cie, Brussels, Belgium
Filed Nov. 28, 1967, Ser. No. 686,224
Claims priority, application France, Dec. 6, 1966, 86,334
Int. Cl. G01n 27/02
U.S. Cl. 324—65
6 Claims

ABSTRACT OF THE DISCLOSURE

Apparatus for continuously detecting the presence of water in organic liquids including a resistance probe placed within a thermostatically controlled enclosure into which the liquid to be analyzed penetrates by running down along the walls and is placed in equilibrium with its vapor, one of the conductive wires of the probe being heated so as to prevent condensation of the saturated vapor.

BACKGROUND OF THE INVENTION

The present invention relates to apparatus for the detection of the water content of certain liquids, and particularly to apparatus for continuously measuring the water content of organic liquid compounds such as, for example, the chlorinated derivatives of methane, ethane, ethylene and propylene.

The present invention is particularly concerned with an improved measuring element constructed to rapidly and continuously produce an accurate correlation between the concentration of water in the liquid to be analyzed and the resistivity of a hygroscopic element which is placed in direct contact with the vapor of such liquid.

Techniques are already known for determining variations in the water concentration of a gas by a simple measurement of resistivity variations produced on a probe placed in the gas itself and composed of a hygroscopic element whose resistivity varies as a function of the quantity of water which it adsorbs. The quantity of water adsorbed is itself proportional to the concentration of water in the vapor phase.

The principle of operation of such probes is well known and is described, for example, in U.S. Pat. No. 2,285,421, issued on June 9, 1942, to Dunmore. Industrial detectors of this type generally employ a hygroscopic element composed of lithium chloride to which has been added a binder and a humidifier. Such lithium chloride probes are utilized particularly in the dry-cleaning industry for determining the relative humidity of the solvent.

Such detectors are generally placed in a branch communicating with a reservoir of the solvent and it is necessary, in order for the detector to be effective and accurate, to supply it with a gaseous phase containing substantially the same degree of humidity as the solvent to be analyzed. In order to achieve this, it has been proposed to create a circulation of the gaseous phase present in the reservoir between this reservoir and an exterior measuring enclosure containing the probe.

Alternatively, the probe can be placed in a gaseous atmosphere created by bubbling compressed air through the solvent.

In addition to their structural complexity, and despite all known preventive measures, the means proposed for obtaining a gaseous sample having a humidity level comparable to that of the liquid present certain operating difficulties particularly in that, on the one hand, the establishment of an equilibrium between the liquid and vapor phases is difficult and can not be achieved with great accuracy and, on the other hand, there is a considerable risk of errors appearing due to the condensation of liquid on the probe itself.

SUMMARY OF THE INVENTION

It is a primary object of the present invention to overcome these drawbacks and difficulties.

A further object of this invention is to permit a continuous measurement of the water content of various types of liquids.

Another object of the present invention is to improve the accuracy of such water content measurements.

Still another object of the invention is to facilitate the creation of a vapor phase in equilibrium with the liquid to be monitored.

Yet another object of the invention is to prevent the condensation of the vapor on the measuring probe.

These and other objects according to the present invention are achieved by the provision of certain improvements in apparatus for continuously determining the concentration of water in an organic liquid by measuring the variations in resistivity of a layer of hygroscopic material whose resistivity varies as a function of the concentration of water in the vapor to which it is exposed, which apparatus includes a probe carrying the layer and having two conductive wires separated from one another and in electrical contact with the hygroscopic layer for permitting the resistivity of the layer to be measured.

According to one improvement of the present invention, the apparatus further includes a measuring vessel in which the probe is inserted, and liquid flow means connected to the vessel for causing the liquid whose water content is to be determined to enter the vessel near the top thereof, to run down the inner wall of the vessel, and to leave the vessel near the bottom thereof.

According to another improvement of the present invention, the apparatus further includes adjustable current supply means connected between the ends of one of the wires for causing the one wire to be traversed by an auxiliary heating current whose amplitude is adjustable to maintain the probe at a temperature above the condensation point of the vapor present in the vessel.

According to another important feature of the present invention, the apparatus further includes a helical flow-directing element mounted on the inner wall of the vessel for causing the liquids to follow a helical path as it runs down the inner wall.

In accordance with yet another feature of the present invention, the apparatus further includes a thermostating system to maintain constant, the temperature within the vessel so as to establish a constant liquid-vapor phase equilibrium therein.

DESCRIPTION OF THE PREFERRED EMBODIMENTS

Figure 1:
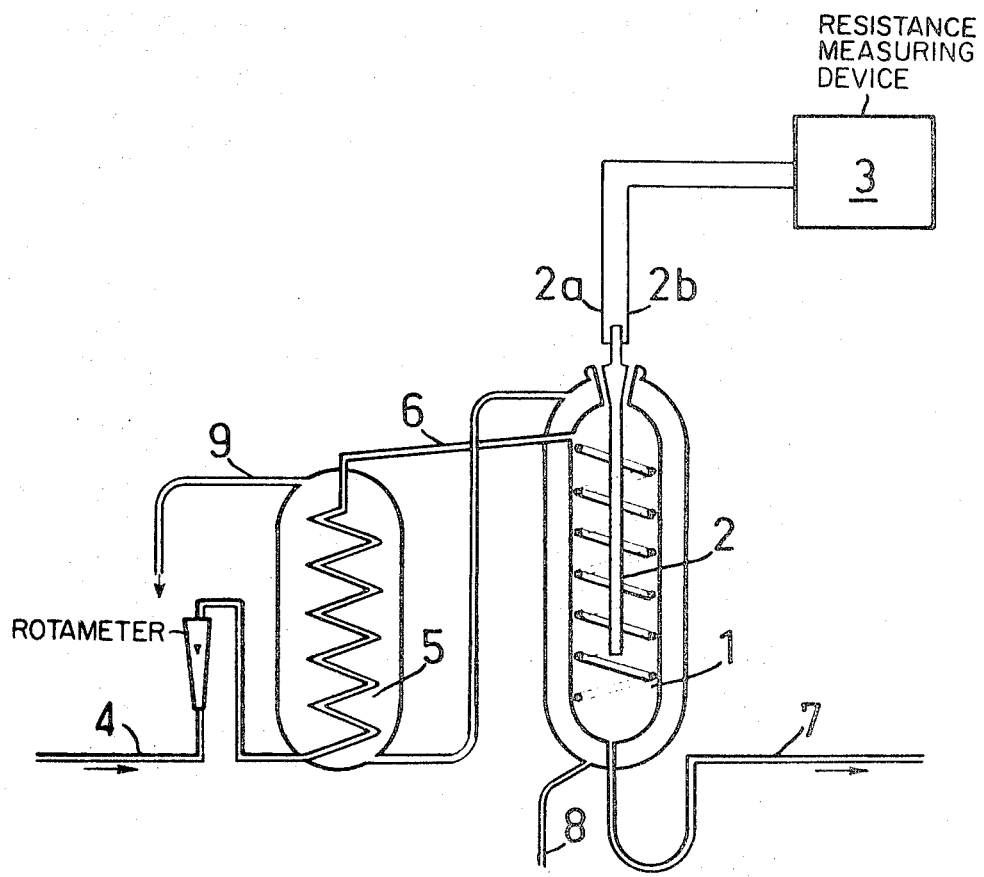
FIG. 1 is a pictorial, cross-sectional view of apparatus incorporating one embodiment of the present invention.

The apparatus illustrated in FIG. 1 includes a measuring chamber 1 composed of an inner vessel preferably made of heat-resistant glass, such as Pyrex for example, and an outer protective envelope spaced from the inner vessel to define a space for the flow of a temperature-controlling fluid. On the inside wall of the inner vessel is mounted a helical coil arranged for imparting a helical descending movement to liquid introduced into the vessel and running down the inside vessel wall. The humidity-measuring probe 2 is inserted into the inner vessel and is provided with two conductive wires 2a and 2b connected to a measuring device 3 containing a microammeter and a voltage source. The microammeter preferably includes a movable pointer associated with a scale which is suitably graduated to permit a direct reading of the water content of the liquid being measured. The microammeter can also be provided with an output for connection to a recording device.

The liquid whose water content is to be measured is delivered to the inner vessel of chamber 1 via an inlet conduit 4, a preheating chamber 5 and a conduit 6 whose outlet communicates with the inside wall of the inner vessel of chamber 1, at a point near the upper end thereof. The liquid flowing from conduit 6 is delivered at such a rate that it remains in contact with, and runs down, the inside wall of the inner vessel. This liquid is directed by the helical coil so that it follows a spiral path down the inside wall until reaching the bottom of the vessel, from where it is removed by a conduit 7.

The liquid flowing down the inside wall of the inner vessel is maintained at a predetermined temperature by the flow of a fluid, whose temperature is thermostatically controlled, through the space between the inside vessel and the outer protective envelope. This fluid is introduced via conduit 8, flows between the inside vessel and the outer protective envelope of chamber 1, then flows through prethermostater 5 in order to prethermostat the liquid passing therethrough, and is removed via conduit 9.

A more posiitve temperature control could be obtained by causing the liquid which is to be analyzed to circulate through a helical tube disposed in the space between the inner vessel and the protective envelope of chamber 1, preferably at its entry into the chamber, before entering the inner vessel.

If it is desired to perform a continuous measurement of the water content of a particular liquid, the apparatus of FIG. 1 could be permanently connected as a bypass in the system utilizing the liquid to be analyzed. This could be accomplished simply by connecting the conduit 4 as the bypass inlet and the conduit 7 as the bypass outlet for returning the liquid to the primary system.

Figure 2:
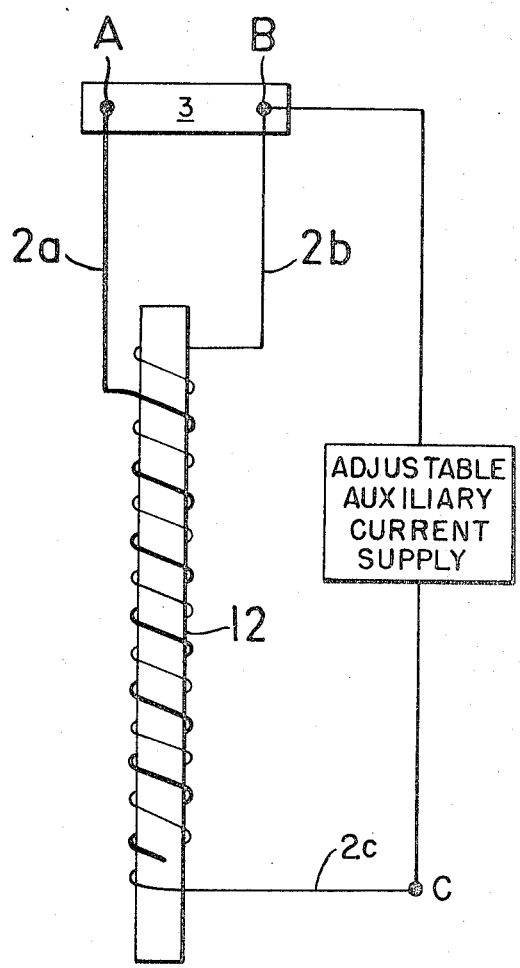
FIG. 2 is an elevational view of one embodiment of the humidity detector according to the present invention.

Turning now to FIG. 2, there is shown a preferred embodiment of the probe 2 which includes a cylindrical support 12 made of electrical insulating material and two conductive wires, preferably of platinum, wound about support 12 and each having one end connected by a respective one of the leads 2a and 2b to a respective one of the terminals A and B, these terminals being disposed in the measuring device 3 of FIG. 1. The other end of the wire connected to lead 2a is not provided with any connection, while the other end of the wire connected to lead 2b is connected to a third lead 2c provided with a terminal C. The assembly of the support 12 and the two wires wound thereon is then covered with a film of a hygroscopic material composed of lithium chloride combined with a binder and glycerine. The film is not shown in FIG. 2.

Since the resistivity of the film on the probe varies as a function of the amount of water vapor which it adsorbs, a measure of the humidity within the inner vessel of chamber 1, and hence of the water content of the liquid being analyzed, can be obtained by any technique which provides an indication of the value of the resistance which the lithium chloride film presents between the two wires.

As the measurement is being obtained, an auxiliary heating current is passed through the wire connected between terminals B and C in order to maintain the probe at a temperature which is higher than the condensation point of the saturated vapor present within the inner vessel.

One of the principal advantages presented by apparatus according to the present invention is that the measuring vessel can be directly supplied with liquid and no separate steps need be taken to obtain a vapor sample because the delivery of the liquid to be analyzed in such a manner as to cause it to run down the walls of the measuring vessel has been found to represent a particularly effective method of maintaining a constant liquid-vapor phase equilibrium. It will be readily appreciated that this constitutes a substantial simplification over prior art arrangements.

In addition, the heating of the measuring probe, according to the present invention, totally eliminates the risk of condensation which has heretofore been a principal source of errors in the resulting vapor concentration indication.

It has been found that apparatus according to the present invention is particularly well suited for obtaining a continuous indication of the moisture content, or humidity, of an organic product during the course of its fabrication. For this purpose, the apparatus could be connected with the fabrication system in the form of a permanent bypass, as has been described above.

The apparatus according to the present invention can be employed for analyzing many types of organic liquids. It has been found to be particularly useful for measuring the concentration of water in chlorinated hydrocarbons, and particularly 1,2-dichloroethane. When apparatus according to the present invention has been employed for analyzing such liquids, it has been found that in most cases the presence of hydrochloric acid concentrations of as high as 500 milligrams per liter has no adverse effect on the resulting measurements.

The sensitivity of the resulting measurement depends, among other things, on the construction of the probe itself. Generally, such probes are constructed by winding two platinum wires on a non-conductive support and by then covering the assembly with a film made of a compound composed of lithium chloride combined with a binder and a humidifier. In certain cases, particularly when the probe is intended to measure the water concentration of liquids, such as dichloroethane, in which water is relatively soluble, it is desirable that the measuring device be particularly sensitive. It has been found that the requisite sensitivity for these cases can be achieved if a particularly effective humidifier, such as glycerine for example, is employed in the film covering the probe.

It will be understood that the above description of the present invention is susceptible to various modifications, changes, and adaptations, and the same are intended to be comprehended within the meaning and range of equivalents of the appended claims.

What is claimed is:

1. An apparatus for continuously determining the concentration of water in an organic liquid by measuring variations in the resistivity of a layer of hygroscopic material whose resistivity varies as a function of the concentration of water in the vapor to which it is exposed, which apparatus includes a probe carrying the layer and having two conductive wires separated from one another and in electrical contact with the hygroscopic layer for permitting the resistivity of the layer to be measured, and means connected between the two wires for producing an indication of the value of the resistance present between the wires and hence of the amount of water adsorbed by the layer, the improvement comprising:

a measuring vessel in which said probe is inserted, and liquid flow means connected to said vessel for causing the liquid whose water content is to be determined, to enter said vessel near the top thereof, to run down the inner wall of said vessel, and to leave said vessel near the bottom thereof;

adjustable current supply means connected between the ends of one of said wires for causing said one wire to be traversed by an auxiliary heating current whose amplitude is adjusted to maintain said probe at a temperature above the condensation point of the vapor present in said vessel; and a thermostating system connected to said vessel for maintaining constant the temperature in said vessel thereby to establish a constant liquid-vapor phase equilibrium therein.

2. An arrangement as defined in claim 1 further comprising a helical flow directing element mounted on said inner wall of said vessel for causing the liquid to follow a helical path as it runs down said inner wall.

3. An arrangement as defined in claim 2 wherein said vessel is cylindrical.

4. An arrangement as defined in claim 1 wherein said hygroscopic layer contains glycerine as a humidifier.

5. An arrangement as defined in claim 1 wherein said probe comprises a support of insulating material on which said two conductors are wound in a helical manner, and wherein said hygroscopic layer covers said support and said wires.

6. An arrangement as defined in claim 1, wherein said liquid flow means are also connected to receive a chlorinated hydrocarbon whose water concentration is to be determined.

References Cited

UNITED STATES PATENTS

| | | | |
|---|---|---|---|
| 2,367,561 | 1/1945 | Bouyoucos | 338—35 |
| 2,717,957 | 9/1955 | Ohlheiser | 338—35 |
| 2,967,084 | 1/1961 | Reitz | 8—142 |
| 3,056,935 | 10/1962 | Jensen | 338—35(324—65H) |

EDWARD E. KUBASIEWICZ, Primary Examiner

U.S. Cl. X.R.

338—35